United States Patent [19]

Büschelberger et al.

[11] Patent Number: 5,214,488
[45] Date of Patent: May 25, 1993

[54] FIBER OPTIC SAGNAC INTERFEROMETER WITH DIGITAL PHASE MODULATION FOR MEASURING ROTATION RATE

[75] Inventors: Hanns-Jürgen Büschelberger, Kirchzarten; Günter Spahlinger, Stuttgart, both of Fed. Rep. of Germany

[73] Assignee: LITEF GmbH, Freiburg im Breisgau, Fed. Rep. of Germany

[21] Appl. No.: 828,722

[22] Filed: Jan. 31, 1992

[30] Foreign Application Priority Data

Feb. 11, 1991 [EP] European Pat. Off. ........ 91101872.9

[51] Int. Cl.$^5$ .............................................. G01C 19/64
[52] U.S. Cl. ................................................... 356/350
[58] Field of Search .......................................... 356/350

[56] References Cited

FOREIGN PATENT DOCUMENTS 2227833  8/1990 United Kingdom .

Primary Examiner—Vincent P. McGraw
Attorney, Agent, or Firm—Elliott N. Kramsky

[57] ABSTRACT

An open loop fiber optic rotation rate sensor of the type that is subject to bias errors arising from the coupling of disturbing signals into the input of a demodulator. Such errors are suppressed by the use of a demodulation signal that is statistically independent of all signal sources that may cause disturbing signals. A modulation signal generator includes a random number generator from which two signals ($b_0$, $b_1$) for a statistically alternating bias for activating optimal working points on the interferometer characteristic with positive or negative gradient and an appropriately matched demodulation signal (d) are derived. The demodulation signal, after transit time correction, acts upon the synchronous input of the synchronous demodulator.

2 Claims, 6 Drawing Sheets

FIBER OPTIC SAGNAC INTERFEROMETER WITH DIGITAL PHASE MODULATION FOR MEASURING ROTATION RATE

BACKGROUND

1. Field of the Invention

The present invention relates to a fiber optic Sagnac interferometer for measuring rotation rates. More particularly, this invention pertains to such an interferometer in which bias errors due to electromagnetic cross-couplings are substantially reduced.

2. Description of the Prior Art

Rotational movements produce phase shifts between the two oppositely circulating light beams of a Sagnac interferometer. As a result a rotation-dependent interference image is formed by superposition of the two beams.

The interferometer transfer function is defined as:

$$I = I_0 \cdot \tfrac{1}{2} \cos(\Delta\phi)$$

Where $I_0$ is the light intensity in the absence of a phase shift (please refer to FIG. 1). The phase shift (Sagnac phase) is related to the speed of rotation $\Omega$ as follows:

$$\Delta\phi = \frac{2\pi LD}{\lambda c} \Omega$$

Where:
L = length of optical path;
D = diameter of a circular optical path;
$\lambda$ = wavelength of the light; and
c = velocity of light.

The above-described transfer function possesses two considerable disadvantages when applied to a (rotational) sensor. First, the function is insensitive to small input values at the maximum of the cosine curve. Secondly, the sign of the phase shift cannot be determined from the intensity signal.

To remedy these problems, it is customary to shift the working point on the characteristic into the region of greater sensitivity through phase modulation. Two types of modulation frequently employed are sinusoidal as shown in FIG. 2a and square-wave as shown in FIG. 2b. The action of such a signal upon of the optical phase modulator produces a sensitive transfer function that is capable of recognizing sign.

Synchronous signal demodulation (shown in FIG. 2) provides the phase shift and, thus, the speed of rotation.

FIG. 3 is a block diagram of a Sagnac interferometer (rotation rate sensor) in accordance with the described prior art. The device includes a closed fiber loop, a light source L such as a laser whose parallel light beams are polarized by a polarizer P and split into light beams by a beamsplitter ST2 and injected in opposite directions into an interferometer fiber coil FS. The coil FS preferably consists of optical monomode fiber. The beam splitter ST2 also serves as a mixer for recombining the light beams after passing through the fiber coil FS. After passing through the polarizer P, the interference signal of the two superposed light beams passes via a second beamsplitter ST1 and output branch OUT to a photodetector PD that scans the intensity of the interference image. If $\Delta\phi_0$ were to designate the phase difference between the two counterpropagating light beams in the closed fiber coil FS, then, in the absence of nonreciprocal disturbance, $\Delta\phi_0 = 0$.

The electrical signal VD from the photodetector PD is accentuated by an impedance converter and amplifier $A_0$ whose output signal VD' feeds a synchronous demodulator SYNCD that is synchronized with the modulation frequency $f_0$. The demodulated output signal passes through an amplifier A as signal VA to an output interface S whose output signal is proportional to the rotation rate and contains the sign information that identifies the direction of rotation.

The principle of operation of the readout process for fiber-optic rotation rate sensors, as described with reference to FIG. 3, leads, in the operation of inertial devices for measuring rotation rate, to considerable difficulties (described below).

The voltage level of the modulation signal, VC or VC', to the phase modulator PM is on the order of a few volts in magnitude. However, the voltage level of the detector signal VD is a few nanovolts, corresponding to an apparatus rotation speed of 1°/h. Undesired stray effects of VC and VC' on VD lead to falsification of the measurement signal. The signal processing output includes apparent rotation rates. The null or working point of the measuring arrangement is altered by inherent disturbances, such stray effects indicated in FIG. 3 by broken lines and the coupling factor K.

It would be clearly desirable to eliminate (or at least reduce) electromagnetic strays (disturbances having a coupling factor K; refer to FIG. 3) by shielding measures and incorporation of filters into signal and voltage feed lines. This is indicated in FIG. 3 by shielding of the connecting line from the driver amplifier AP to the phase modulator PM. In the known interferometer of FIG. 3, this leads to particular difficulties. The signal VC (or VC') contains the modulation frequency $f_0$ generated in an oscillator OSC. The photodetector signal VD, detected in the synchronous demodulator SYNCD, contains rotation rate information at the same frequency and phase relationship. The circuit assemblies that generate the modulation of frequency $f_0$, and the portion of the circuit for conducting the signal sensitive to rotation rate (possessing the same frequency) are closely spaced and must, as a rule, be fed from a common power supply device. Thus, it is clear that a danger of stray electromagnetic energy of frequency $f_0$ entering into the sensitive signal path (signal VD) exists. The addition of filters for blocking $f_0$ to the signal lines is not possible since the desired signal information is present at precisely this frequency. Thus, undesired stray signal energy can be reduced to a limited extent only by, for example, shielding the amplifier $A_0$ and the synchronous demodulator SYNCD against the remainder of the circuit and filtering the power supply. Despite such measures, the above-mentioned level conditions reveal that some coupling between the signals VC, VC' and VD is unavoidable regardless of all possible screening measures.

SUMMARY AND OBJECTS OF THE INVENTION

It is therefore an object of the present invention to provide a fiber optic Sagnac interferometer that is free from falsification of the measurement signal as a result of the coupling of stray modulation signals into the output signal.

The present invention addresses the foregoing object by providing, in a first aspect, a method for modulating a fiber optic Sagnac interferometer for measuring rotation rates of the type in which two light beams originating from a light source and polarized by a polarizer are generated by beam splitting, then injected in opposite directions into a fiber coil and subsequently recombined. The interference image produced, after passing through the polarizer, acts upon a detector device whose output signal corresponds to the light intensity of the interference image. The two light beams are modulated by a phase modulator located in the fiber coil and the amplified photodetector output signal is fed to a synchronous demodulator.

The method includes the step of driving the phase modulator with a modulation signal that comprises the sum of a first component formed from alternately successive values of zero and $\pi/2$ and a second component formed from substantially correlation-free successive values of zero and $\pi$. The synchronous demodulator is driven with a signal that comprises the transit-time corrected product of four factors: a first having the value $-1$; a second being $-1$ when the second component is zero and $+1$ when the second component is $\pi$; a third being $-1$ when the second component of the last preceding modulation cycle is zero and $+1$ when the second component of the last preceding modulation cycle was $\pi$; and a fourth factor being $-1$ when the first component is zero and $+1$ when the first component is $\pi/2$. Finally, the product of the four above-identified factors is corrected by a transit time compensation corresponding to the transit time of light of each one of the light beams through the fiber coil and the processing time for the summation to obtain the second signal component, to combine the first and second signal components to form the signal for driving the phase modulator and a digital/analog conversion of the drive signal.

In a second aspect, the invention provides an improved fiber optic Sagnac interferometer wherein means is provided for driving the phase modulator, driving the synchronous demodulator and correcting the product as described in the preceding paragraph.

The foregoing features and advantages of this invention will become further apparent from the detailed description that follows. This description is accompanied by a set of drawing figures. Numerals of the drawing figures, corresponding to those of the written text, point to the features of the invention, like numerals referring to like features throughout.

DETAILED DESCRIPTION

As the basis of the invention, the inventors have recognized that the bias errors arising from the coupling of disturbing signals into the demodulator input can be suppressed by the use of a demodulation signal that is statistically independent of all sources that may cause such disturbing signals.

Figure 3:
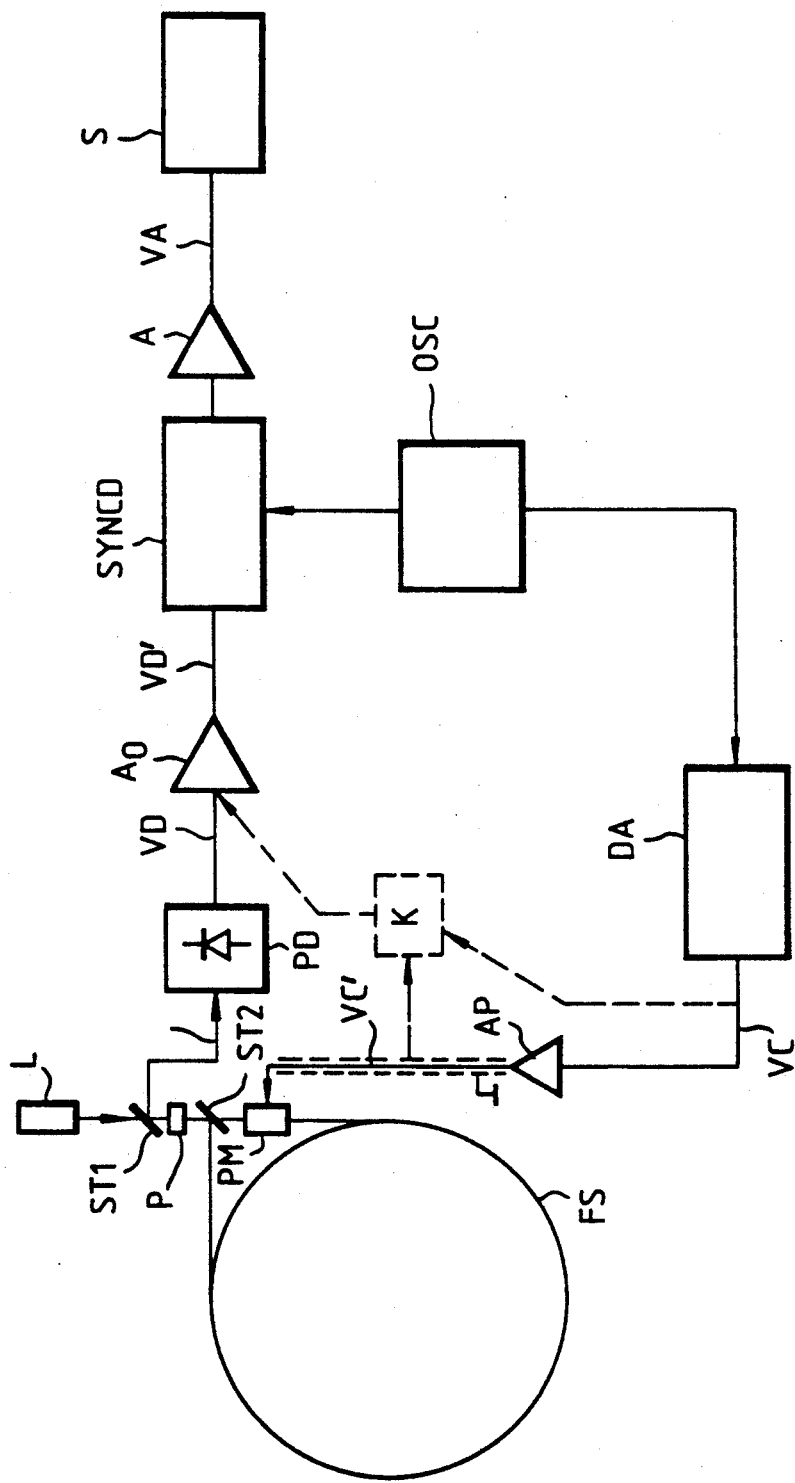
FIG. 3 is a block diagram of a fiber optic rotation rate sensor in the so-called open loop configuration.
Figure 4:
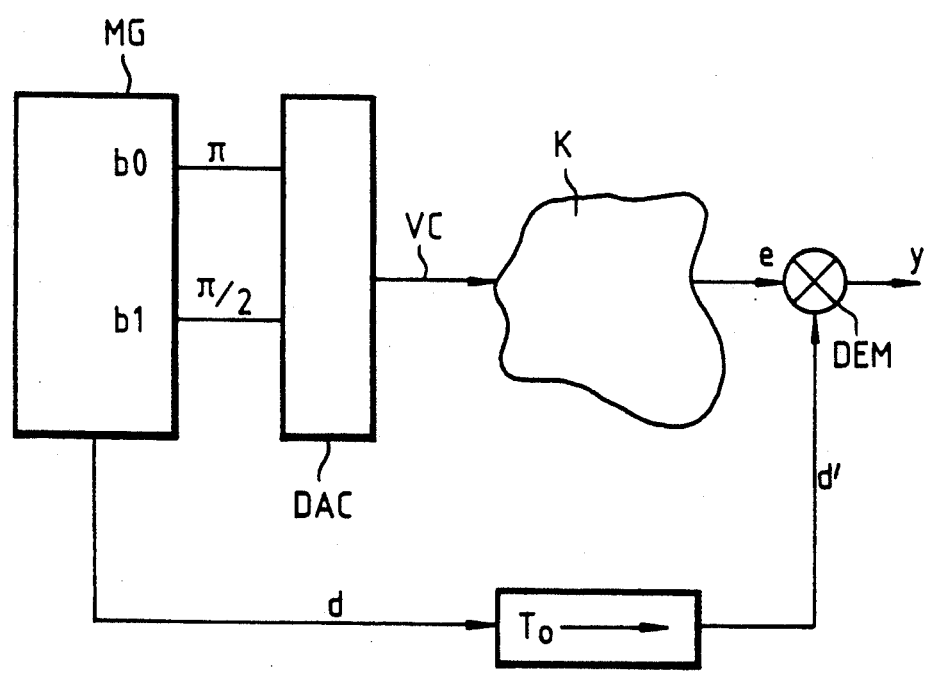
FIG. 4 is a block diagram of the assemblies of a fiber optic Sagnac interferometer or ring interferometer of significance for modulation and demodulation in accordance with the invention.

FIG. 4 is a block diagram for illustrating the portion of a fiber optic ring interferometer that is essential to the invention (i.e. the parts and assemblies for accomplishing modulation and demodulation.) A modulation signal generator MG generates a modulation signal that consists of bits b0 and b1 having the values $\pi$ and $\pi/2$ respectively. After conversion by a digital/analog converter DA, the modulation signal drives, as signal PMS, the phase modulator PM (refer to FIG. 3) and, thus, the gyro K. As mentioned, the bit b0 has the value $\pi$; all higher-value bits are suppressed so that a modulo-$2\pi$ operation is automatically performed in the D/A converter DA. The output signal PMS of the digital/analog converter DA passes through the interferometer arrangement or the gyro path and passes, in the form of a signal "e" that is proportional to the received light intensity I, to the input of a demodulator DEM. The modulation signal generator MG delivers the required demodulation signal "d", which passes, after a transit time compensation $T_0$, to the demodulator DEM. The transmit time compensation $T_0$ compensates the signal transit times which have arisen (i.e. the transit time $t_0$ of the light of each one of the light beams through the fiber coil FS) as well as the processing time for summation to obtain the second signal component according to the invention, to combine the first and second signal components to form the drive signal PMS for the phase modulator P as well as for the digital/analog conversion in the digital/analog converter DA. The transit time compensation insures that the demodulation signal d delivered by the modulation signal generator MG "fits" the received signal e as a transit-time-corrected demodulation signal d'.

In order to guarantee the above-mentioned statistical independence of the demodulation signal from signals that may act as sources of disturbance, the modulation signal generator MG contains a random number generator from which the signals b0, b1 and d are derived. It is alternatively possible to employ permanently stored signal patterns composed so that the required statistical independence is obtained. The following description is based on a solution that employs a random number generator as shown in the block diagram of FIG. 5.

Figure 1:
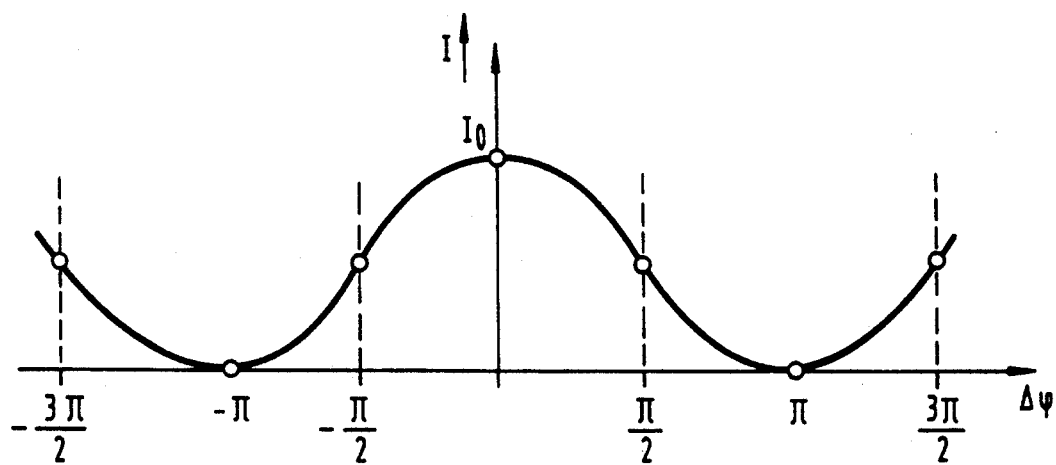
FIG. 1 is a graph that illustrates the transfer function of a fiber optic rotation rate sensor.
Figure 2A:
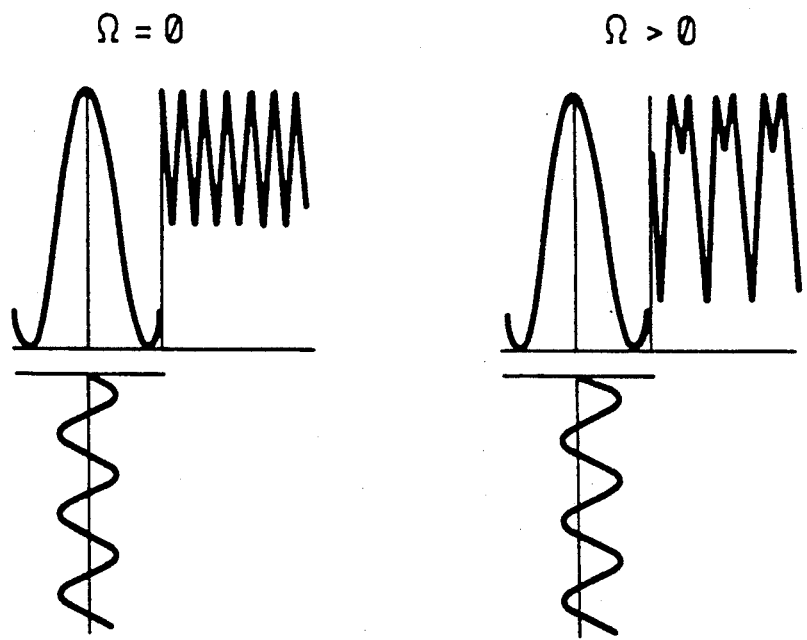
FIGS. 2a and 2b illustrate sinusoidal modulation and square-wave modulation, respectively, of a transfer function in accordance with FIG. 1 for shifting the working point to the re9ion of greatest sensitivity.
Figure 2B:
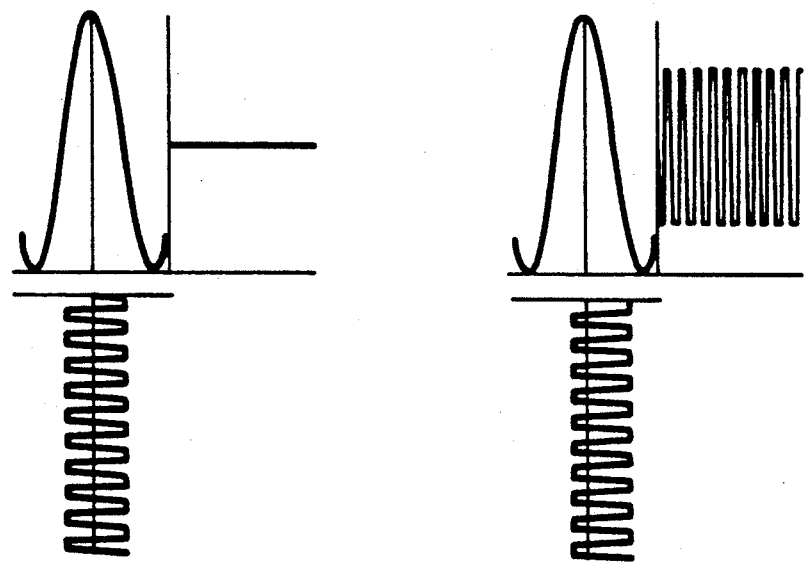

As may be inferred from the interferometer characteristic shown in FIG. 1, the points of reversal of the gradient (greatest measurement sensitivity) to be activated lie at odd multiples of $\pi/2$. At zero rate of rotation (rest condition), the interferometer phase consists of the difference between the instantaneous modulation phase p(n) and the temporally preceding modulator phase p(n−1). To insure that his difference is in all cases an odd multiple of $\pi/2$, p(n) must be alternately an even and an odd multiple of $\pi/2$ respectively. That is, the bit b1 of value $\pi/2$, delivered by the modulation signal generator MG, must constantly oscillate.

$$b1(n)=\{\ldots 0,1,0,1,0,1,0,1 \ldots\}$$

The bit b1(n) is generated from an internal signal s(n), where:

$$s(n)=(-1)^n$$

$$b1(n)=(s(n)+1)/2.$$

The bit b0 delivered by the modulation signal generator MG is initially arbitrary and can be used as degree of freedom for selection of points of the interferometer characteristic of positive or negative gradient. In the proposed solution, the bit b0 is derived from the numerical sequence R(n) that is delivered by a random number generator and which, uniformly distributed and statistically independent, corresponds to the values −1 or 1. The bit b0 is obtained as:

$$b0(n)=(r(n)+1)/2.$$

Thus, the sign of the respectively selected point of the interferometer characteristic is obtained from:

$$d(n)=-r(n)\cdot r(n-1)\cdot s(n).$$

The sign signal as generated (refer to FIG. 5) is used to demodulate the received signal after it has passed through the transit time compensation $T_0$.

Figure 5:
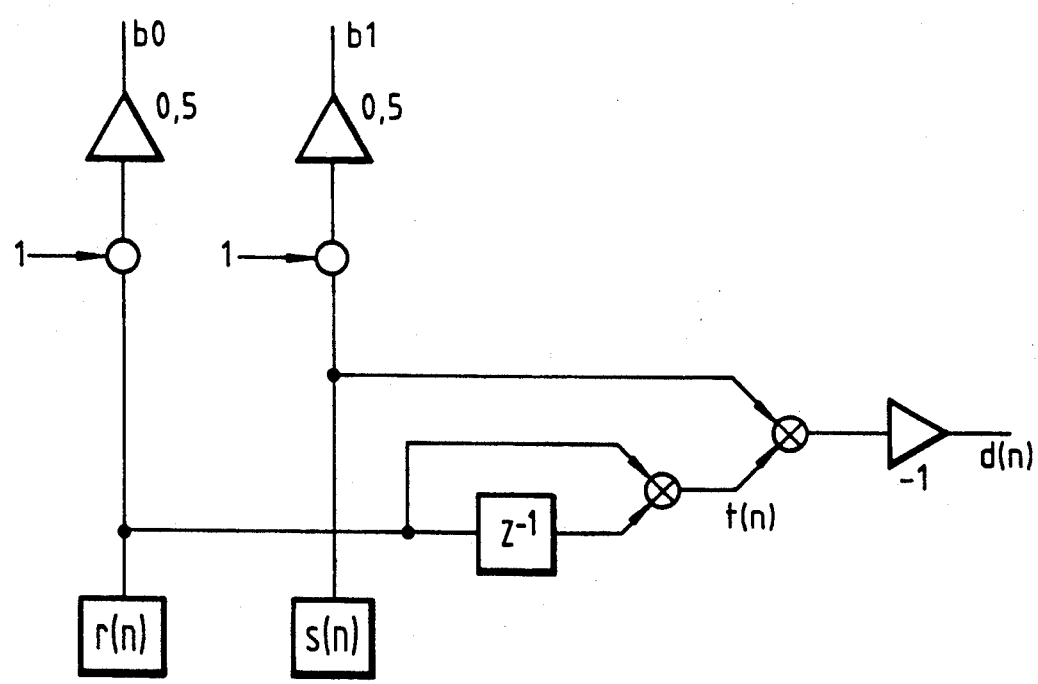
FIG. 5 is a diagram of a modulation signal generator for incorporation into the arrangement of FIG. 4.

The structure, following from the above equations, of the modulation signal generator MG is evident from FIG. 5. The signal d(n) is statistically independent of s(n), although s(n) is utilized for generation thereof. However, in forming d(n), s(n) is again entirely scrambled by the multiplication by the product $r(n)\cdot r(n-1)$ formed from random numbers. However, the demodulation signal d(n) is also statistically independent of r(n), because $t(n)=r(n)\cdot r(n-1)$ is statistically independent of r(n); that is, the cross-correlation Crt(i) between r(n) and t(n) is identically equal to zero. This result is clearly evident for i unequal to 0 and 1 as then the terms of the series r(n) and t(n) that are shifted relative to one another by 0 or 1 positions no longer carry any common information. For i=0 or 1, it results that the cross-correlate of Crt(0) and Crt(1) respectively corresponds to the mean value of the series r(n), such mean value being equal to zero in accordance with the conditions.

The correlation between r(n) and t(n) may be represented as follows:
The following is applicable:

$$t(n)=r(n)\cdot r(n-1)$$

$$Crt(i) = \lim_{N\to\infty} \frac{1}{2N} \sum_{n=-N}^{N} r(n) \cdot t(n+i)$$

$$Crt(0) = \lim_{N\to\infty} \frac{1}{2N} \sum_{n=-N}^{N} r(n) \cdot r(n) \cdot r(n-1) = \overline{r(n)} = 0$$

$$Crt(1) = \lim_{N\to\infty} \frac{1}{2N} \sum_{n=-N}^{N} r(n) \cdot r(n+1) = \overline{r(n)} = 0$$

For $i \neq 0$ and $i \neq 1$:
$Crt(i) = 0$ for all $i$.

From the above, d(n) is statistically independent in the linear sense of all signals appearing in the modulation process. Thus, the initially presented conditions are satisfied.

Figure 6:
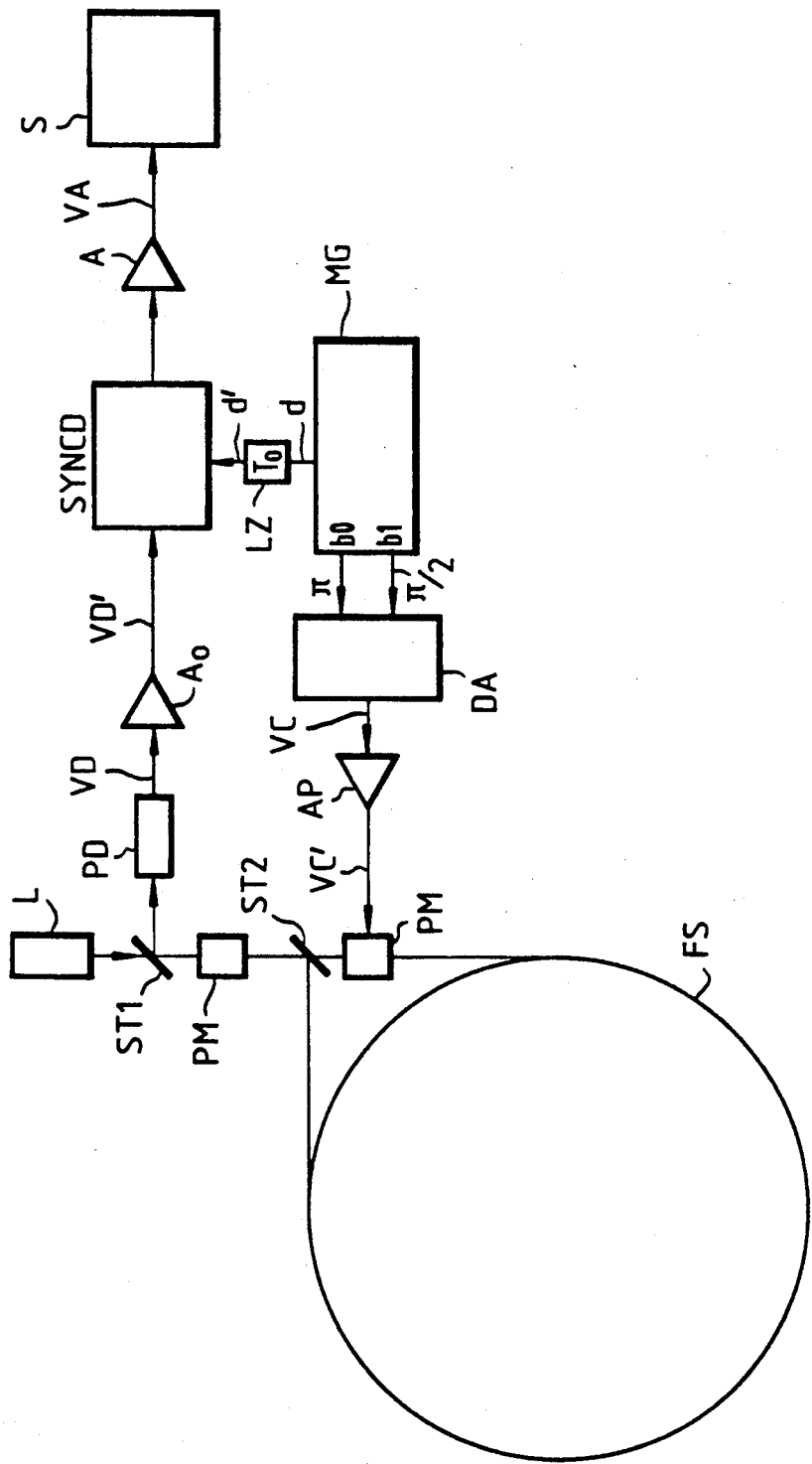
FIG. 6 is a block diagram of a fiber optic rotation rate sensor in open loop configuration incorporating features of the invention.

FIG. 6 is a block circuit diagram, corresponding generally to FIG. 3, of a open loop rotation rate sensor including statistical generation of the modulation signal for the phase modulator PM in accordance with the invention. Assemblies already known from the explanation of FIG. 3 are not described again.

As shown, the oscillator OSC of FIG. 3 is replaced by a modulation signal generator MG as discussed with reference to FIGS. 4 and 5 above. The demodulation signal d passes through a transit time compensation LZ and acts, as transit-time-corrected signal d', on the synchronous signal input of the synchronous demodulator SYNCD. The signals $b_0$ and $b_1$, generated and described in accordance with FIG. 5, pass to the D/A converter DA, as described above with reference to FIG. 4.

The invention provides a modulation process for the drive signal of a phase modulator of a fiber optic ring interferometer for measuring rotation rate. The process avoids bias errors caused by electro-magnetic cross-coupling such as those that occur in the prior art, without enlarging the required range of modulation for the phase modulator.

The use, according to the invention, of statistically independent random generators is especially suitable for avoidance of crosstalk effects originating with adjacent electronic assemblies in multi-axis rotation rate sensor arrangements constructed in a confined space.

While this invention has been described with reference to its presently-preferred embodiment, it is not limited thereto. Rather, this invention is only limited insofar as it is defined by the following set of patent claims and includes within its scope all equivalents thereof.

What is claimed is:

1. A method for modulating a fiber optic Sagnac interferometer for measuring rotation rate of the type in which two light beams originating from a light source are polarized by a polarizer and generated by beam splitting, then injected in opposite directions into a fiber coil and subsequently recombined to produce an interference image, after passing through the polarizer, that acts upon a detector device whose output signal corresponds to the light intensity of the interference image, and in which the two light beams are modulated by a phase modulator located in the fiber coil and the amplified photodetector output signal is fed to a synchronous demodulator, said method comprising the steps of:

a) driving said phase modulator with a modulation signal that comprises the sum of a first component formed from alternately successive values of zero and $\pi/2$ and a second component formed from substantially correlation-free successive values of zero and $\pi$;

b) driving said synchronous demodulator with a signal that comprises the transit-time corrected product of four factors, (i) a first of which has the value −1; (ii) a second being −1 when said second component is zero and +1 when said second component is $\pi$, (iii) a third being −1 when the second component of the last preceding modulation cycle is zero and +1 when the second component of said last preceding modulation cycle was $\pi$ and (iv) a fourth factor being −1 when said first component is zero and +1 when said first component is $\pi/2$; and c) correcting the product of said four factors by a transit time compensation corresponding to the transit time of the light of each one of said light beams through said fiber coil and to the processing time for the summation to obtain said second signal component, to combine said first and said second signal components to form said signal for driving said phase modulator and a digital/analog conversion of said drive signal.

2. In a fiber optic Sagnac interferometer for measuring rotation rate of the type in which two light beams originating from a light source and polarized by a polarizer are generated by beam splitting, injected in opposite directions into a fiber coil and subsequently recombined, and the interference image produced, after passing through the polarizer, acts upon a detector device whose output signal corresponds to the light intensity of the interference image, and in which the two light beams are modulated by a phase modulator located in the fiber coil and the amplified photodetector output signal is fed to a synchronous demodulator, the improvement comprising, in combination:

a) means for driving said phase modulator with a modulation signal that comprises the sum of a first component formed from alternately successive values of zero and $\pi/2$ and a second component formed from substantially correlation-free successive values of zero and $\pi$;

b) means for driving said synchronous demodulator with a signal that comprises the transit-time corrected product of four factors, (i) a first of which has the value $-1$; (ii) a second being $-1$ when said second component is zero and $+1$ when said second component is $\pi$, (iii) a third being $-1$ when the second component of the last preceding modulation cycle is zero and $+1$ when the second component of said last preceding modulation cycle was $\pi$ and (iv) a fourth factor being $-1$ when said first component is zero and $+1$ when said first component is $\pi/2$; and c) means for correcting the product of said four factors by a transit time compensation corresponding to the transit time of the light of each one of said light beams through said fiber coil and to the processing time for the summation to obtain said second signal component, to combine said first and said second signal components to form said signal for driving said phase modulator and a digital/analog conversion of said drive signal.

* * * * *